United States Patent [19]

Ono

[11] Patent Number: 4,529,922
[45] Date of Patent: Jul. 16, 1985

[54] RESOLVER-TYPE ROTATIONAL POSITIONING ARRANGEMENT

[75] Inventor: Tadahiro Ono, Shizuoka, Japan

[73] Assignees: Toshiba Kikai Kabushiki Kaisha; Toei Denki Kabushiki Kaisha, both of Tokyo, Japan

[21] Appl. No.: 550,405

[22] Filed: Nov. 10, 1983

[30] Foreign Application Priority Data

Nov. 15, 1982 [JP] Japan .................................. 57-200081

[51] Int. Cl.³ .............................................. G05B 1/06
[52] U.S. Cl. .................................... 318/603; 318/605; 318/661; 318/329
[58] Field of Search ............... 318/600, 603, 605, 606, 318/607, 608, 632, 661, 329

[56] References Cited

U.S. PATENT DOCUMENTS

| | | | |
|---|---|---|---|
| 3,859,760 | 1/1975 | Grieb et al. | 318/603 X |
| 3,866,214 | 2/1975 | Taylor | 318/600 X |
| 3,872,369 | 3/1975 | Rich | 318/603 |
| 4,010,463 | 3/1977 | Kay | 318/661 X |
| 4,021,714 | 5/1977 | Jones et al. | 318/605 X |
| 4,095,158 | 6/1978 | Matsumoto | 318/603 |
| 4,253,051 | 2/1981 | Schneider | 318/608 X |
| 4,264,850 | 4/1981 | Cannon et al. | 318/606 X |
| 4,282,468 | 8/1981 | Barker et al. | 318/661 X |
| 4,292,577 | 9/1981 | Cesarz et al. | 318/811 X |
| 4,310,790 | 1/1982 | Mulet-Marquis | 318/608 |
| 4,339,700 | 7/1982 | Desbiens et al. | 318/660 |
| 4,340,848 | 7/1982 | Hanagata et al. | 318/603 X |
| 4,342,950 | 8/1982 | Kohzai et al. | 318/611 |
| 4,358,722 | 11/1982 | Iwakane et al. | 318/616 X |
| 4,358,723 | 11/1982 | Scholl et al. | 318/661 |
| 4,384,242 | 5/1983 | Ono | 318/661 X |

Primary Examiner—William M. Shoop
Assistant Examiner—Bentsu Ro
Attorney, Agent, or Firm—Cushman, Darby and Cushman

[57] ABSTRACT

A resolver type motor speed control arrangement including an exciting signal generating circuit including a first frequency division counter for producing from a clock pulse an exciting voltage signal supplied to the primary winding of the resolver coupled to the motor, reference signal generating means in the form of a up-down counter for generating a reference signal having a predetermined period from the clock pulse, circuit means for supplying a feed pulse to the reference signal generating means for varying the phase of the reference signal, phase detecting means for synchronously rectifying the output signal of the secondary winding of the resolver in accordance with the reference signal, speed signal generating means for generating a speed signal corresponding to the speed of the motor or the resolver and a servo-amplifier responsive to outputs of the phase detecting means and the speed signal generating means. There is provided a second frequency division counter for dividing the frequency of the feed pulse supplied to the reference signal generating means and for counting the number of the feed pulses, a digital to analogue converter for converting the counts of the second frequency division counter into analogue signals, and an adder connected between the servo-amplifier and the digital to analogue converter for adding the output of the digital analogue converter to the output of the phase detecting means.

9 Claims, 4 Drawing Figures

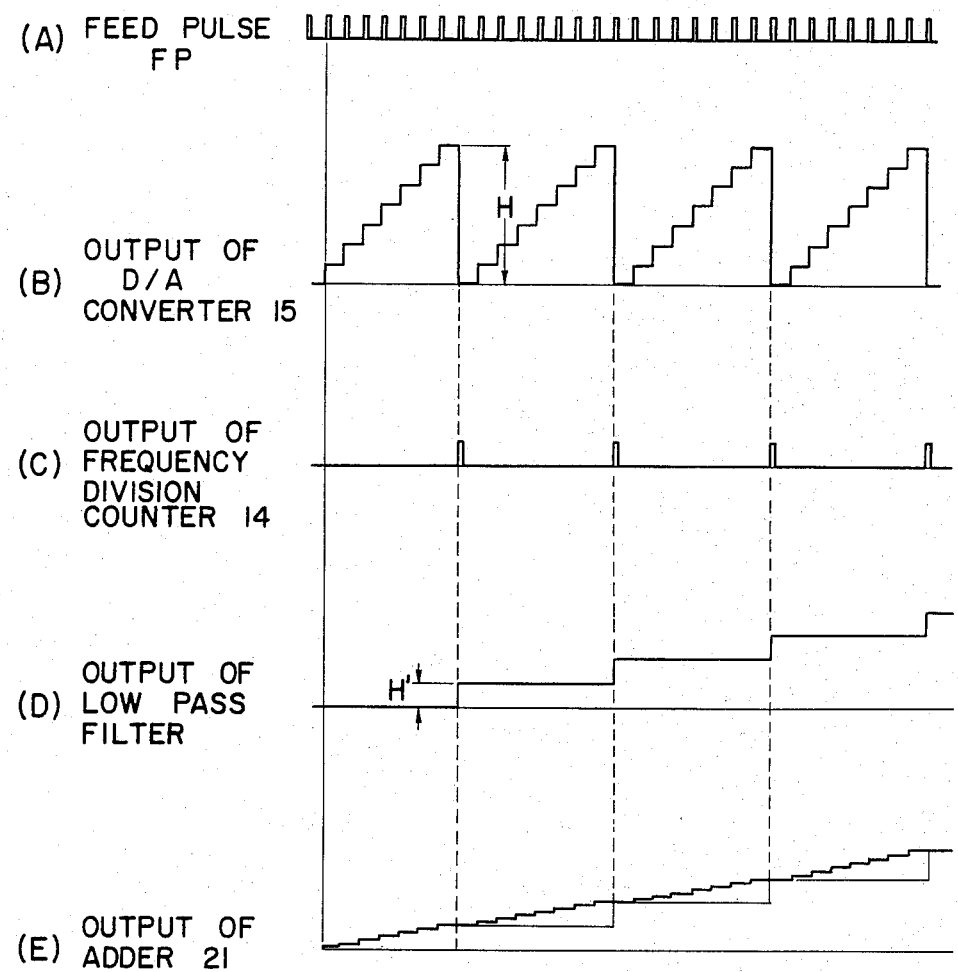

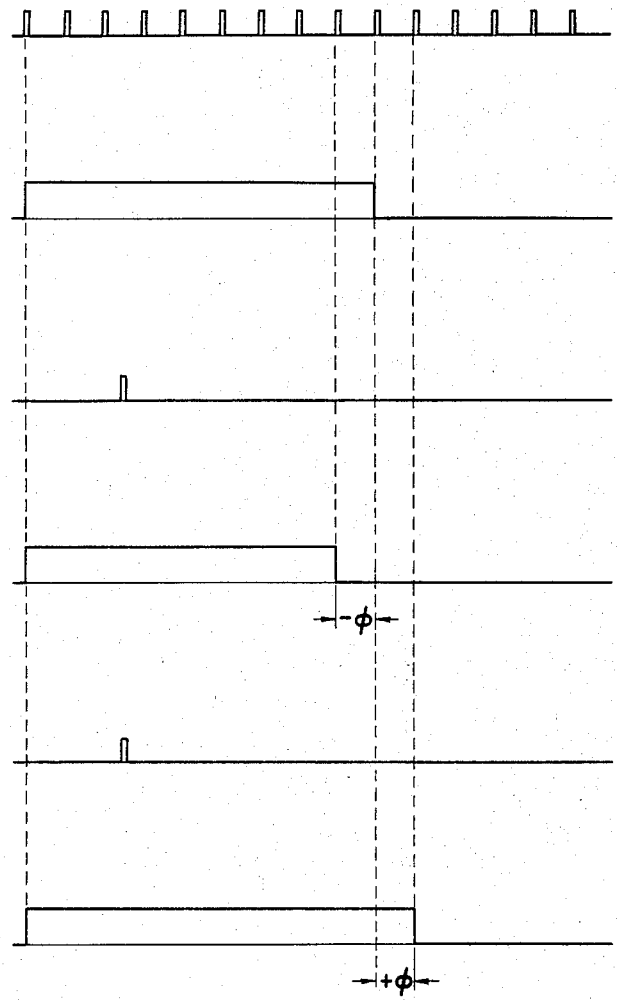

RESOLVER-TYPE ROTATIONAL POSITIONING ARRANGEMENT

BACKGROUND OF THE INVENTION

This invention relates to resolver-type positioning apparatus for a rotary drive system.

In known resolver-type positioning apparatus for a rotary drive system, a frequency division counter is used to produce an exciting voltage signal having sinusoidal or rectangular waveform from a clock pulse, and the exciting voltage signal is supplied to the primary winding of a resolver coupled to the rotary drive system, for example an electric motor. Furthermore, a up-down counter is used to produce a reference signal from the clock pulse and a feed pulse so as to drive a predetermined amount the rotary drive system based on a phase difference between the reference signal and an output produced by the secondary winding of the resolver.

With this system, since the resolution of the resolver is determined by the frequency of the clock pulse and the up-down counter, it is necessary to increase the frequency of the clock pulse in order to improve the resolution. However, since there is a upper limit for the clock pulse frequency the improvement of the resolution is also limited.

SUMMARY OF THE INVENTION

It is an object of this invention to provide an improved resolver-type rotary drive system positioning apparatus having improved resolution thereof without resorting to increasing clock pulse frequency.

According to our invention there is provided a positioning apparatus for a rotary drive system comprising:

a resolver having primary and secondary windings;

an exciting signal generating circuit including a clock pulse generator for generating clock pulses and a first frequency division counter for producing from the clock pulses an exciting voltage signal supplied to said primary winding;

reference signal generating means for generating, from the clock pulses, a reference signal having a predetermined period;

a feed pulse generator for generating a feed pulse signal;

circuit means for varying a phase of the reference signal in response to the feed pulse signal;

phase detecting means for rectifying an output signal of the secondary winding of said resolver synchronously with the reference signal;

speed signal generating means for generating a speed signal corresponding to a speed of the rotary drive system;

a servo-amplifier responsive to outputs of the phase detecting means and the speed signal generating means for driving said rotary drive system;

the circuit means including a second frequency division counter for dividing a frequency of the feed pulse supplied to the reference signal generating means and for counting the number of feed pulses and a digital to analogue converter for converting counts of the second frequency division counter into digital signals; and an adder for adding an output of said digital to analogue converter to an output of said phase detecting means and provide an addition result to said servo-amplifier.

BRIEF DESCRIPTION OF THE DRAWINGS

In the accompanying drawings:

FIGS. 2, 3 and 4 show input and output waveforms of various component elements of the embodiment shown in FIG. 1.

DESCRIPTION OF THE PREFERRED EMBODIMENT

Figure 1:
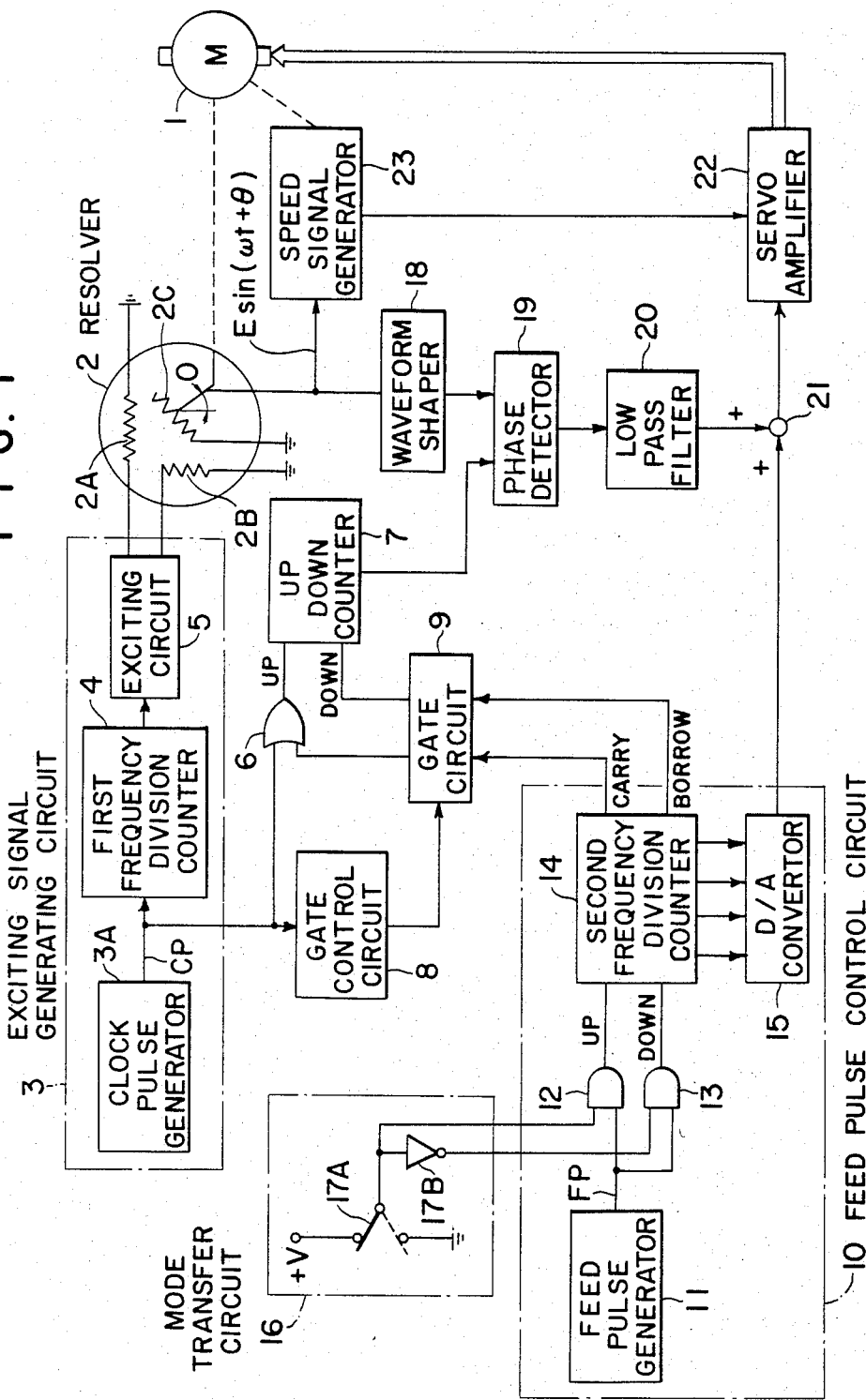
FIG. 1 is a block diagram illustrating one embodiment of this invention.

In FIG. 1, as a rotary drive system is shown an electric motor 1, and the rotor shaft of a resolver 2 is connected to the motor shaft. The resolver 2 has two stationary primary windings 2A and 2B supplied with exciting voltage signals 90° out of phase with respect to each other from an exciting signal generating circuit 3, and a secondary winding 2C is mounted on the resolver's rotor. The exciting signal generating circuit 3 comprises a clock pulse generator 3A, a first frequency division counter 4 which divides the frequency of the clock pulse CP generated by the clock pulse generator 3A and inverts the polarity of the output at a predetermined number of divided frequencies, and an exciting circuit 5 applying 90° phase difference sinusoidal exciting voltage signals to the primary windings 2A and 2B in accordance with the output of the frequency division counter 4.

The clock pulse CP is also supplied to the UP input terminal of a up-down counter 7 via an OR gate circuit 6 and to a gate circuit 9 after its phase has been changed 90° by a gate control circuit 8 containing a phase shifter, not shown, which shifts the phase of a clock pulse by 90°. This is necessary to make the two inputs to OR gate circuit 6 have a 90° phase difference from one another. The gate circuit 9 is enabled while it is being supplied with the clock pulse CP 90° phase changed by the gate control circuit 8 so as to apply a carry pulse from a feed pulse control circuit 10 to the UP terminal of the up-down counter 7 via the OR gate circuit 6 and to apply a borrow pulse to the DOWN terminal of the up-down counter 7 from the feed pulse control circuit 10. The up-down counter 7 is constructed such that its output level would be inverted when the difference between the number of pulses inputted to the UP terminal and the number of pulses inputted to the DOWN terminal becomes equal to the divided output frequency from the second frequency division counter 14.

The feed pulse control circuit 10 comprises a feed pulse generator 11, two AND gate circuits 12 and 13 with one inputs connected to receive the feed pulse FP generated by the feed pulse generator 11, a second frequency division counter 14 adapted to supply the output of the AND gate circuit 12 to the UP terminal of the up-down counter 7 and to supply the output of the AND gate circuit 13 to the DOWN terminal of the up-down counter 7, and a digital/analogue converter 15 for converting the digital signal outputted from the second frequency division counter 14 into an analogue signal. The other input terminals of the AND gate circuits 12 and 13 are supplied with signals having different levels or polarities from a mode transfer circuit 16 made up of a transfer switch 17A and an inverter 17B. The second frequency division counter 14 counts the number of feed pulses FP supplied to the UP terminal to deliver its digital count to the D/A converter 15. When the count reaches a predetermined number, the counter 14 supplies a carry pulse to the UP terminal of the up-down counter 7 through gate circuit 9 and OR gate circuit 6. When a feed pulse FP is applied to the DOWN terminal, the count of the second frequency division counter 14 is counted down, and each time the count decreases a predetermined number, the counter 14 sends a borrow pulse to the DOWN terminal of the up-down counter 7 via gate circuit 9.

The output of the up-down counter 7 is supplied to a phase detector 19 together with a signal having a rectangular waveform and produced by a waveform shaper 18 which converts an alternating current signal induced in the secondary winding 2C of resolver 2. The phase detector 19 effects a synchronous rectification of the output of the waveform shaper 18 by utilizing the output of the up-down counter 7 as a reference signal. The synchronously rectified signal is averaged by a low pass filter 20 and then applied to an adder 21 to be added to the output of the D/A converter 15. The output of the adder 21 is supplied to a servo-amplifier 22 which is also supplied with a speed signal generated by a speed signal generator 23 which may be a tachometer generator coupled to the shaft of the motor 1, in which case the output of the tachometer generator is proportional to the speed of the motor 1. However, there are many types of suitable speed signal generators that are known, one of which is shown in FIG. 5 of U.S. Pat. No. 4,384,242 dated May 17, 1983. The speed signal generator disclosed in that patent comprises a differentiator which differentiates the phase modified voltage E sin $(\omega t + \theta)$ induced in the secondary winding of the resolver 2 and a synchronous rectifier rectifying the output of the differentiator to obtain a signal $K2E(d\theta/dt)$ in which K represents a constant and E a voltage. In any case, the output of the speed signal generator 23 is directly or indirectly proportional to the speed of the motor or resolver.

The embodiment shown in FIG. 1 operates as follows. Each time a predetermined number of clock pulses CP shown in FIG. 2(A) are applied to the first frequency division counter 4, the output level of the counter 4 changes between high and low levels (or the polarity is reversed), as shown in FIG. 2(B). The exciting circuit 5 supplies exciting voltage signals having a phase difference of 90° to the primary windings 2A and 2B of the resolver 2 based on the output of the first frequency division counter 4.

Assume now that the rotor of the motor assumes a rotational angle $\theta$ when a sinusoidal exciting voltage signal shown by FIG. 2(C) is applied to the primary winding 2A of the resolver 2, a sine wave having a phase difference $\theta$ with respect to the sine wave supplied to the primary winding 2A (see FIG. 2(C)) will be induced in the secondary winding 2C. The sine wave induced in the secondary winding 2C is converted into a rectangular waveform shown in FIG. 2(E) by the waveform shaper 18, the output thereof being synchronously rectified by the phase detector 19 with the output from the up-down counter 7 as a reference circuit. Where the feed pulse control signal 10 does not produce a signal, only a clock pulse CP is supplied to the UP terminal of the up-down counter 7 so that the output thereof would be a rectangular wave synchronous with the output from the first frequency division counter 4 as shown in FIG. 2(F). Then the output of the phase detector 19 would have a waveform as shown in FIG. 2(G) obtained by synchronously rectifying the waveform shown in FIG. 2(E) by utilizing the waveform shown in FIG. 2(F) as a reference signal. The synchronously rectified output is averaged with low pass filter 20 as shown in FIG. 2(H) and then inputted to the servo-amplifier 22 through adder 21. Then the motor 21 rotates in a direction such that the servo-amplifier 22 will cancel the output of the low pass filter 20 so that the motor 1 is synchronized at a position where the output of the low pass filter 20 is zero. In other words, the motor 1 synchronizes at a position of $\theta = 90°$ where the positive and negative components shown in FIG. 2(G) are equal.

When switch 17A of the mode transfer circuit 16 is thrown to the solid line position, since a H level signal V is applied to one input of AND gate circuit 12 and since a L level signal is applied to one input of AND gate circuit 13, a feed pulse FP from the feed pulse generator 11 would be applied to the UP terminal of the second frequency division counter 14 via AND gate circuit 12. When the switch 17A is thrown to the dotted line position, a L level signal is applied to one input of AND gate circuit 12, and a H level signal is applied to one input of AND gate circuit 13 so that the feed pulse FP from the feed pulse generator 11 would be applied to the DOWN terminal of the second frequency division counter 14 through AND gate circuit 13. Consequently, the second frequency division counter 14 counts up each time its UP terminal receives a feed pulse FP, whereas counts down each time its DOWN terminal receives a feed pulse FP. Digital count of the counter 14 is applied to the D/A converter 15, and when the counted up count of the counter 14 reaches a predetermined value, a carry signal is sent to the UP terminal of the up-down counter 7, whereas when the count is counted down to a predetermined value, a borrow pulse is sent to the DOWN terminal of the up-down counter 7 to reset the same. For example, when it is designed that each time when eight feed pulses FP are applied to the UP terminal of the second frequency division counter 14 it outputs a carry pulse to reset the up-down counter 7. The output of the D/A converter 15 will be shown by FIG. 3(B), and the output of the second frequency division counter 14 supplied to the UP terminal of the up-down counter 7 will be shown by FIG. 3(C).

When a pulse (shown in FIG. 4(C)) is applied to the UP terminal from the feed pulse control circuit 10, the phase of the output of the up-down counter 7 would be dephased by $-\phi$ ($\phi$ represents one period of the clock pulse) from that produced when only the clock pulse CP is applied (see FIG. 4(D)). Conversely, when a pulse from the feed pulse control circuit 10 is applied to the DOWN terminal of the up-down counter 7 (see FIG. 4(E)) its output will be dephased by $+\phi$ from that shown in FIG. 4(B) as shown by FIG. 4(F). Since the output of the up-down counter 7 acts as a reference signal of the phase detector 19, as the phase of the output of the up-down counter 7 is dephased by $\phi$, the phase detector 19 would output a voltage corresponding to the phase $\phi$. This voltage is averaged by the low pass filter 20 and then added to the output of the D/A converter 15 with adder 21.

Where the maximum level H of the output of the D/A converter 15 is made to be equal to the level H' of the voltage outputted from the low pass filter 20 when a single pulse is inputted to the up-down counter 7 from the feed pulse circuit 10 as shown in FIGS. 3(B) and 3(D), the output of adder 21 can be made to include many steps as shown in FIG. 3(E) so that the speed of the motor 1 can be controlled smoothly via servo-amplifier 22.

FIGS. 4(A)–4(F) explain the operation of up/down counter 7. Assume that up/down counter 7 produces a signal "1" (see FIG. 4(B)) while 10 clock pulses are inputted to its "up" terminal. When the number of clock pulses reaches 10, the counter output becomes "0". During this interval when a pulse, shown in FIG. 4(C) and having a phase difference of 90° with respect to the clock pulse is applied to the counter's "up" terminal, the count of the up/down counter reaches "10" at the nineth clock pulse, so that the output period of the up/down counter becomes shorter by $\phi$ than that shown in FIG. 4(B) as shown in FIG. 4(D). When a pulse shown in FIG. 4(E) is applied to the counter's "down" terminal, the output period of the up/down counter 7 becomes longer by $\phi$ as shown in FIG. 4(F). In this manner, while up/down counter 7 is counting when additional pulses are applied to its "up" or "down" terminal, the period of outputting increases or decreases by $\phi$ as shown in FIGS. 4(D) and 4(F).

Figure 2:
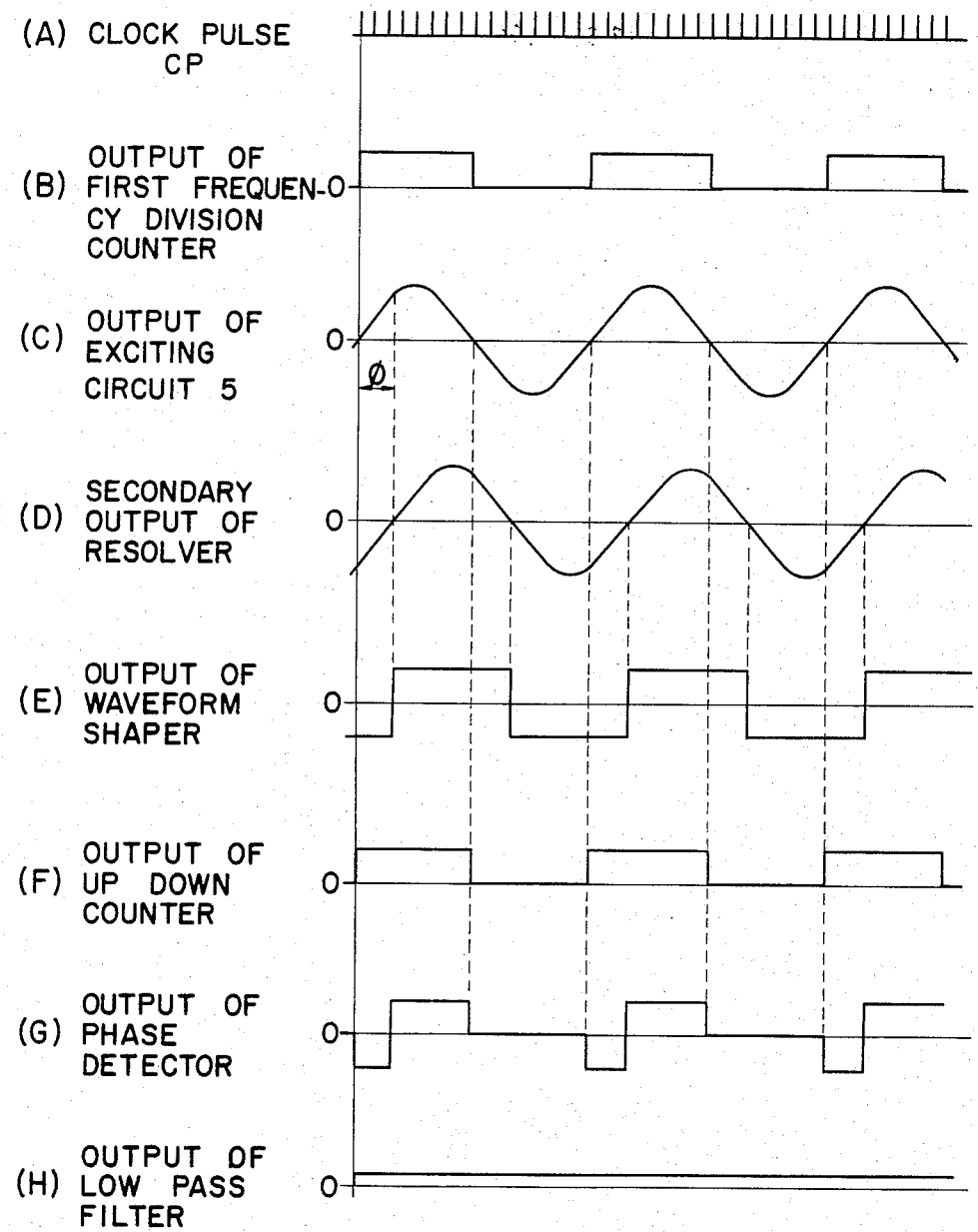

Referring to FIG. 2, the relations among waveforms shown in FIGS. 2(E), 2(F) and 2(G) are as follows. The polarity of the output of waveform detector 18 (see FIG. 2(E)) has a definite relation with respect to the secondary output of the resolver shown in FIG. 2(D). The output of the first frequency division counter 4, shown in FIG. 2(B) and the output of the up/down counter 7 shown in FIG. 2(F) have the same phase. Since waveforms shown in FIGS. 2(E) and 2(C) have a phase difference of $\phi$, the negative portion of the waveform shown in FIG. 2(E) appears in the output of the phase detector 19 as shown in FIG. 2(G). Since the ratio between the positive and negative portions of the waveform shown in FIG. 2(G) is 2:1, the output of the low pass filter 20 will have a small positive value as shown in FIG. 2(H). The operation described above is termed herein as "synchronous rectification".

In the absence of gate circuits 8 and 9 and feed pulse control circuit 10, the outputs of the up down counter 7 and the first frequency division counter 4 would have the same phrase. However, when feed pulses are applied to the down terminal of the up down counter 7 from circuit 10, the outputs of counters 4 and 7 are dephased while maintaining the same period. Angle $\phi$ is not constant but varies depending upon the number of pulses from control circuit 10. In FIG. 2, the output of the first frequency counter 4 (FIG. 2(B)) and the output of the up down counter 7 (FIG. 2(F)) are shown to have the same phase but for the reason described above their phases are not always the same. FIG. 2 is based on the assumption that no pulse is applied to up down counter 7 from circuit 10. The output of the first frequency division counter (FIG. 2(B)), the output of exciting circuit 5 (FIG. 2(C)), and the output of the up down counter 7 (FIG. 2(F)) are shown to have the same phase.

In summary, according to this invention, the number of the feed pulses FP is counted by the second frequency division counter 14, its count is converted into an analogue value by D/A converter 15, and the count of the counter 14 is reset at each predetermined number of counts. When a clock pulse CP is applied, the counter 14 applies a pulse to the up-down counter 7 to vary the phase of a reference signal supplied by the up-down counter 7 to the phase detector 19. The signal outputted by the phase detector 19 is averaged and then added to the analogue signal from the D/A converter 15 and the motor speed is controlled in accordance with the sum signal. For this reason, even when the frequency of the clock pulse CP is not so high the resolution of the resolver can be made sufficiently high.

In a system of controlling the speed of an electric motor it is usual to control the speed according to a speed instruction signal (in this embodiment the output of adder 21) and a feedback speed signal in order to maintain the motor speed at a speed corresponding to the speed instruction signal without overshooting. The output of the speed signal generator 23 is supplied to the (−) input of the servo-amplifier 22 to act as the feedback speed signal.

According to the prior art circuit construction, since the feed pulse FP is directly applied to the UP terminal and the DOWN terminal of the up-down counter 7, the resolution is determined by the relation between the clock pulse CP and the output of the up-down counter 7. For example, when the resolver 2 has two poles, one revolution of the resolver would correspond to one period of the output of the up-down counter 7 so that the resolution of a case wherein there are 20 clock pulses CP in one period as shown in FIG. 4 becomes 20 counts/one revolution. Accordingly, when the resolver is excited with a voltage of 5 KHz in order to obtain a resolution of 10,000 counts/revolution, it is necessary to use a clock pulse having a frequency of 5×10,000 KHz=50 MHz. It is difficult to fabricate a circuit operating at such a high frequency. As can be noted from FIG. 3, according to this invention it is possible to improve the resolution by a factor of 8. In other words, for obtaining the same resolution, the frequency of the clock pulse can be reduced to $\frac{1}{8}$.

Especially, according to this embodiment since the output of the D/A converter 15 is reset each time when 8 feed pulses FP are applied, there is no fear of accumulation of the output error of the D/A converter 15 when the output of the low pass filter 20 and the output of the D/A converter 15 are added together.

Although in the embodiment described above, a sinusoidal exciting voltage signal was applied to the primary windings 2A and 2B of the resolver, the exciting voltage signal may have a rectangular waveform.

Thus, according to this invention it is possible to provide an improved positioning apparatus utilizing a resolver capable of improving its resolution without increasing the frequency of the clock pulse.

I claim:

1. Positioning apparatus for a rotary drive system comprising:

a resolver having primary and secondary windings;

an exciting signal generating circuit including a clock pulse generator for generating clock pulses and a first frequency division counter for producing from said clock pulses an exciting voltage signal supplied to said primary winding;

reference signal generating means for generating, from said clock pulses, a reference signal having a predetermined period;

a feed pulse generator for generating a feed pulse signal;

circuit means for varying a phase of said reference signal in response to said feed pulse signal;

phase detecting means for rectifying an output signal of said secondary winding of said resolver synchronously with said reference signal;

speed signal generating means for generating a speed signal corresponding to a speed of said rotary drive system;

a servo-amplifier responsive to outputs of said phase detecting means and said speed signal generating means for driving said rotary drive system;

said circuit means including a second frequency division counter for dividing a frequency of said feed pulse supplied to said reference signal generating means and for counting the number of said feed pulses and a digital to analogue converter for converting counts of said second frequency division counter into digital signals; and an adder for adding an output of said digital to analogue converter to an output of said phase detecting means and provide an addition result to said servo-amplifier.

2. The apparatus according to claim 1 wherein said reference signal generating means comprises an up-down counter, a gate control circuit which dephases said clock pulse by 90°, a gate circuit controlled by said gate control circuit, and an OR gate circuit for applying said clock pulse to an up terminal of said up-down counter, wherein said gate circuit produces two output signals, one output being applied to said up terminal of said up-down counter through said OR gate circuit, and the other output being applied to a down terminal of said up-down counter.

3. The apparatus according to claim 2 which further comprises a mode transfer circuit including a transfer switch which can be thrown between voltage sources having different levels and an inverter connected to said transfer switch, and wherein said circuit means further comprises a pair of AND gate circuits connected between said feed pulse generator and said second frequency division counter, one input of each said AND gate circuit being inputted with said feed pulse signal from said feed pulse generator, and the other inputs of said AND gate circuits being connected to an output of said transfer switch and an output of said inverter, respectively, whereby said second frequency division counter produces a carry signal and a borrow signal which are applied respectively to said up and down terminals of said up-down counter through said gate circuit.

4. The apparatus according to claim 1 wherein said phase detecting means further comprises a waveform shaper which converts alternating current induced in the secondary winding of said resolver into a rectangular waveform supplied to said phase detecting means whereby the phase detecting means effects synchronous recitifcation of said rectangular waveform in accordance with said reference signal generated by said reference signal generating means.

5. The apparatus according to claim 1 wherein said phase detecting means further comprises a low pass filter connected between an output terminal of said phase detecting means and said adder.

6. The apparatus according to claim 1 wherein said speed signal generating means comprises a tachometer generator coupled to said rotary drive system, and means for applying a speed signal generated by said tachometer generator to said servo-amplifier.

7. The apparatus according to claim 1 wherein said speed signal generator generates a differentiated voltage of a phase modulated signal induced in the secondary winding of said resolver.

8. The apparatus according to claim 1 wherein said exciting voltage signal supplied to said primary winding of said resolver is sinusoidal.

9. The apparatus according to claim 1 wherein said exciting voltage signal supplied to said primary winding of said resolver is rectangular.

* * * * *